(12) United States Patent
Anzicek et al.

(10) Patent No.: US 10,500,977 B2
(45) Date of Patent: Dec. 10, 2019

(54) VEHICLE CHARGING STATIONS EQUIPPED WITH NOTIFICATION SYSTEMS

(71) Applicant: FORD GLOBAL TECHNOLOGIES, LLC, Dearborn, MI (US)

(72) Inventors: Kyle Anzicek, Lapeer, MI (US); John Sturza, Royal Oak, MI (US); Dylan Erb, Allen Park, MI (US); Abdul Lateef, Canton, MI (US); Charles Honick, Livonia, MI (US); Philip Michael Gonzales, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 124 days.

(21) Appl. No.: 15/787,964

(22) Filed: Oct. 19, 2017

(65) Prior Publication Data
US 2019/0118662 A1    Apr. 25, 2019

(51) Int. Cl.
| | |
|---|---|
| *B60L 53/31* | (2019.01) |
| *B60L 53/14* | (2019.01) |
| *B60L 50/90* | (2019.01) |
| *B60L 53/64* | (2019.01) |
| *G08B 21/18* | (2006.01) |
| *G08B 7/06* | (2006.01) |
| *G08B 25/08* | (2006.01) |

(52) U.S. Cl.
CPC .............. *B60L 53/31* (2019.02); *B60L 50/90* (2019.02); *B60L 53/14* (2019.02); *B60L 53/64* (2019.02); *G08B 7/06* (2013.01); *G08B 21/182* (2013.01); *G08B 25/08* (2013.01)

(58) Field of Classification Search
CPC .............. B60L 11/1825; B60L 11/1826; B60L 11/182; B60L 53/12; B60L 50/90; B60L 53/14; B60L 53/31; B60L 53/64; G08B 7/06; G08B 21/182; G08B 25/08; G08B 21/18; H02J 50/90; H02J 7/0027; Y02T 10/7055
See application file for complete search history.

(56) References Cited

U.S. PATENT DOCUMENTS

| | | | |
|---|---|---|---|
| 6,614,204 B2 * | 9/2003 | Pellegrino | G07F 15/005 320/109 |
| 2013/0213344 A1 * | 8/2013 | Stender | B60J 1/2091 123/198 D |
| 2014/0021908 A1 | 1/2014 | McCool et al. | |
| 2014/0285146 A1 * | 9/2014 | Huston | B60L 11/1816 320/109 |
| 2014/0344026 A1 | 11/2014 | Outwater et al. | |
| 2015/0253163 A1 * | 9/2015 | Ruiz Cortez | G01F 1/075 73/198 |

(Continued)

FOREIGN PATENT DOCUMENTS

FR    2974936 A1    11/2012

*Primary Examiner* — Vuthe Siek
(74) *Attorney, Agent, or Firm* — David B. Kelley; Carlson, Gaskey & Olds

(57) ABSTRACT

A vehicle charging includes a housing, a sensor system configured to detect if a vehicle is parked near the housing, and a notification system configured to communicate an alert if the vehicle is parked near the housing and charging has not been initiated within a threshold amount of time. The alert indicates improper usage of the vehicle charging station to an operator of the vehicle.

19 Claims, 4 Drawing Sheets

(56) References Cited

U.S. PATENT DOCUMENTS

| | | | |
|---|---|---|---|
| 2015/0336464 A1* | 11/2015 | Bell | B60L 11/182 |
| | | | 320/108 |
| 2016/0352113 A1 | 12/2016 | Zhao et al. | |
| 2017/0101024 A1 | 4/2017 | Halker et al. | |
| 2017/0136904 A1 | 5/2017 | Ricci | |
| 2017/0164179 A1 | 6/2017 | Jeon et al. | |
| 2019/0061619 A1* | 2/2019 | Reymann | B60Q 9/00 |

* cited by examiner

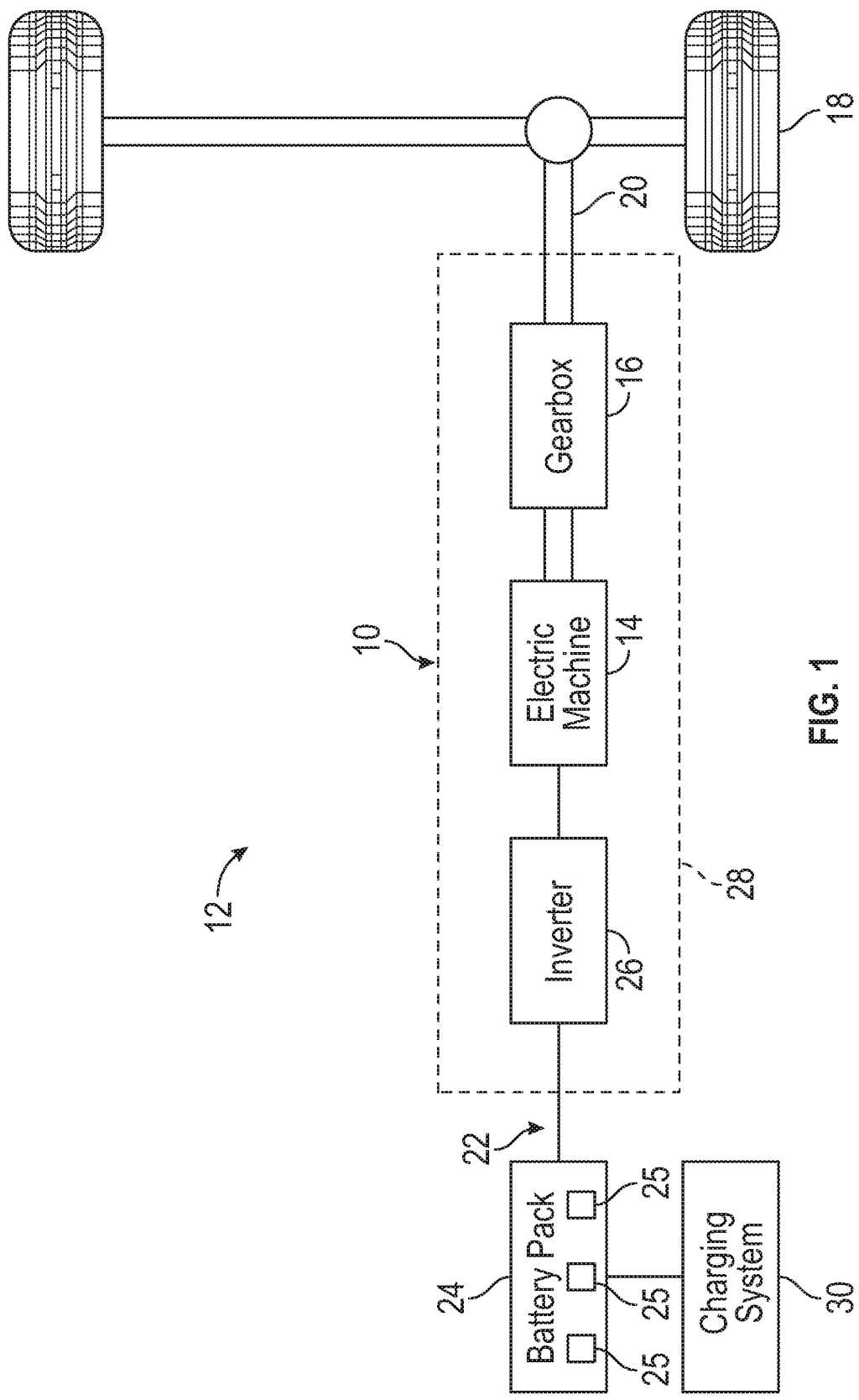

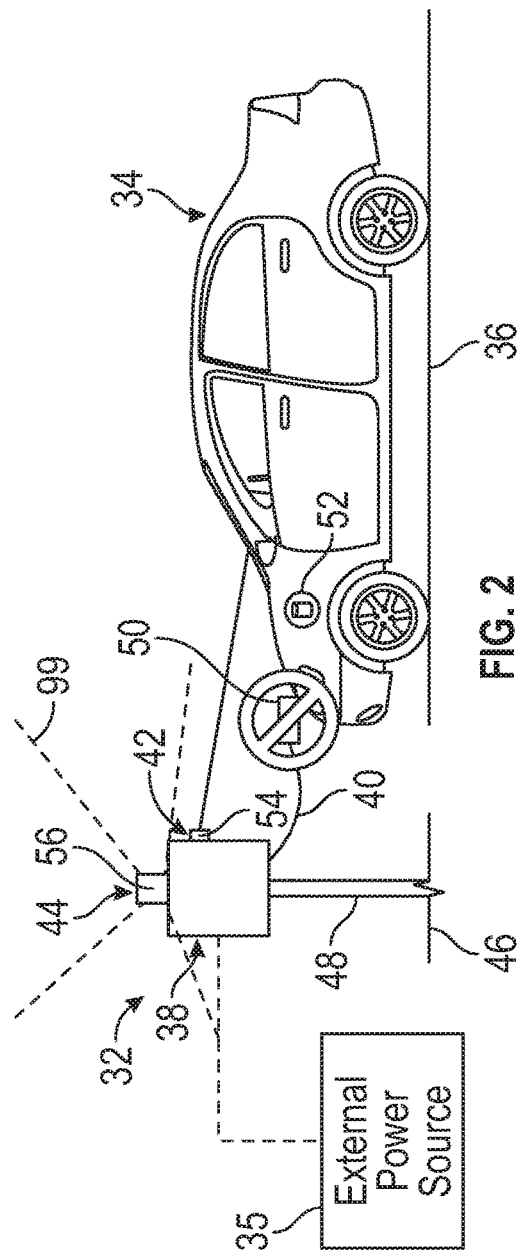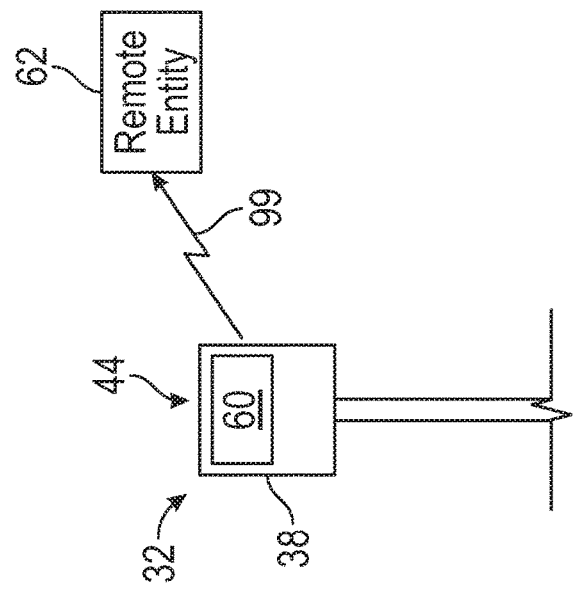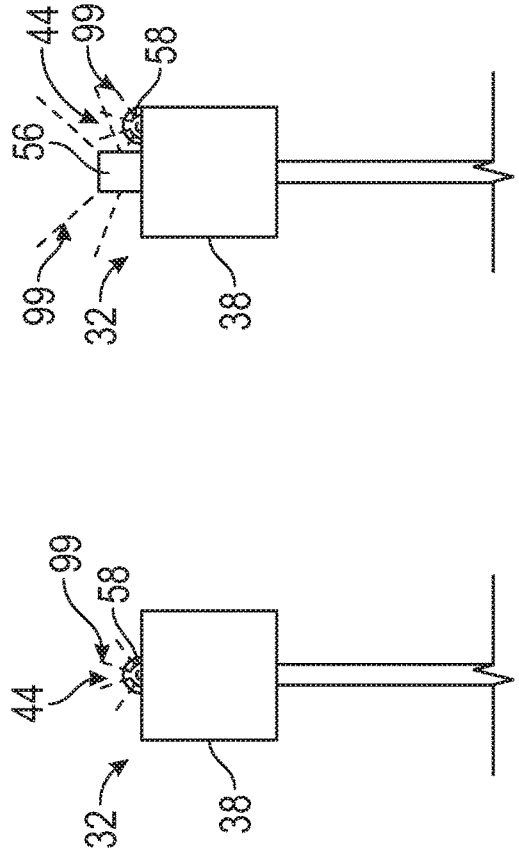

VEHICLE CHARGING STATIONS EQUIPPED WITH NOTIFICATION SYSTEMS

TECHNICAL FIELD

This disclosure relates to vehicle charging stations for charging battery packs of electrified vehicles and issuing alerts in response to improper usages of the charging stations.

BACKGROUND

The need to reduce automotive fuel consumption and emissions is well known. Therefore, vehicles are being developed that reduce or completely eliminate reliance on internal combustion engines. Electrified vehicles are one type of vehicle currently being developed for this purpose. In general, electrified vehicles differ from conventional motor vehicles because they are selectively driven by one or more battery powered electric machines. Conventional motor vehicles, by contrast, rely exclusively on the internal combustion engine to drive the vehicle.

A battery pack typically powers the electric machines and other electrical loads of the electrified vehicle. An expanding infrastructure of vehicle charging stations is being implemented for charging the battery packs of electrified vehicles. Each vehicle charging station is typically mounted with respect to a parking space at which electrified vehicle owners may park and charge their vehicle. Many people may not understand or choose to ignore that these parking spots are designated for electrified vehicles and may block the charging station by parking a conventional engine-powered vehicle in the parking space. This results in the improper utilization of the infrastructure.

SUMMARY

A vehicle charging station according to an exemplary aspect of the present disclosure includes, among other things, a housing, a sensor system configured to detect if a vehicle is parked near the housing, and a notification system configured to communicate an alert if the vehicle is parked near the housing and charging has not been initiated within a threshold amount of time.

In a further non-limiting embodiment of the foregoing vehicle charging station, a charging cord extends from the housing.

In a further non-limiting embodiment of either of the foregoing vehicle charging stations, the charging cord includes a plug for connecting to a vehicle charging port.

In a further non-limiting embodiment of any of the foregoing vehicle charging stations, the sensor system includes a proximity sensor for sensing whether the vehicle is parked in a parking spot associated with the vehicle charging station.

In a further non-limiting embodiment of any of the foregoing vehicle charging stations, the alert is a visual alert produced by a light source of the notification system.

In a further non-limiting embodiment of any of the foregoing vehicle charging stations, the alert is an audible alert produced by a speaker of the notification system.

In a further non-limiting embodiment of any of the foregoing vehicle charging stations, the alert includes both an audible alert produced by a speaker of the notification system and a visual alert produced by a light source of the notification system.

In a further non-limiting embodiment of any of the foregoing vehicle charging stations, the notification system includes a communication system configured to communicate the alert to a remotely located agency.

In a further non-limiting embodiment of any of the foregoing vehicle charging stations, a control module is configured to command the notification system to generate the alert if charging via the vehicle charging station has not been initiated after the threshold amount of time has passed since detecting the vehicle.

In a further non-limiting embodiment of any of the foregoing vehicle charging stations, the control module is configured to monitor a plug connection status signal of a charging cord and a vehicle detection signal from the sensor system.

In a further non-limiting embodiment of any of the foregoing vehicle charging stations, the control module is configured to monitor a wireless connection status signal to determine if the vehicle charging station has been wirelessly connected to the vehicle.

In a further non-limiting embodiment of any of the foregoing vehicle charging stations, the alert indicates improper usage of the vehicle charging station to an operator of the vehicle.

In a further non-limiting embodiment of any of the foregoing vehicle charging stations, the sensor system and the notification system are powered by an external power source.

A method according to another exemplary aspect of the present disclosure includes, among other things, detecting whether a vehicle is parked near a vehicle charging station, and generating an alert from a notification system of the vehicle charging station if charging via the vehicle charging station has not been initiated within a threshold amount of time since detecting the vehicle.

In a further non-limiting embodiment of the foregoing method, detecting whether the vehicle is parked near the charging station includes sensing, with a sensor system of the vehicle charging station, if the vehicle is parked in a parking space associated with the vehicle charging station.

In a further non-limiting embodiment of either of the foregoing methods, the sensor system includes at least one proximity sensor.

In a further non-limiting embodiment of any of the foregoing methods, generating the alert includes producing a visual alert with a light source of the notification system.

In a further non-limiting embodiment of any of the foregoing methods, generating the alert includes producing an audible alert with a speaker of the notification system.

In a further non-limiting embodiment of any of the foregoing methods, generating the alert includes producing a visual alert with a light source of the notification system and producing an audible alert with a speaker of the notification system.

In a further non-limiting embodiment of any of the foregoing methods, generating the alert includes communicating the alert to a remotely located agency with a communication device of the notification system.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 1 schematically illustrates a powertrain of an electrified vehicle.

FIG. 2 illustrates a vehicle charging station for charging a battery pack of an electrified vehicle.

FIG. 3 schematically illustrates an exemplary alert generated by a notification system of a vehicle charging station.

FIG. 4 schematically illustrates another exemplary alert generated by a notification system of a vehicle charging station.

FIG. 5 schematically illustrates yet another exemplary alert generated by a notification system of a vehicle charging station.

DETAILED DESCRIPTION

Figure 6:
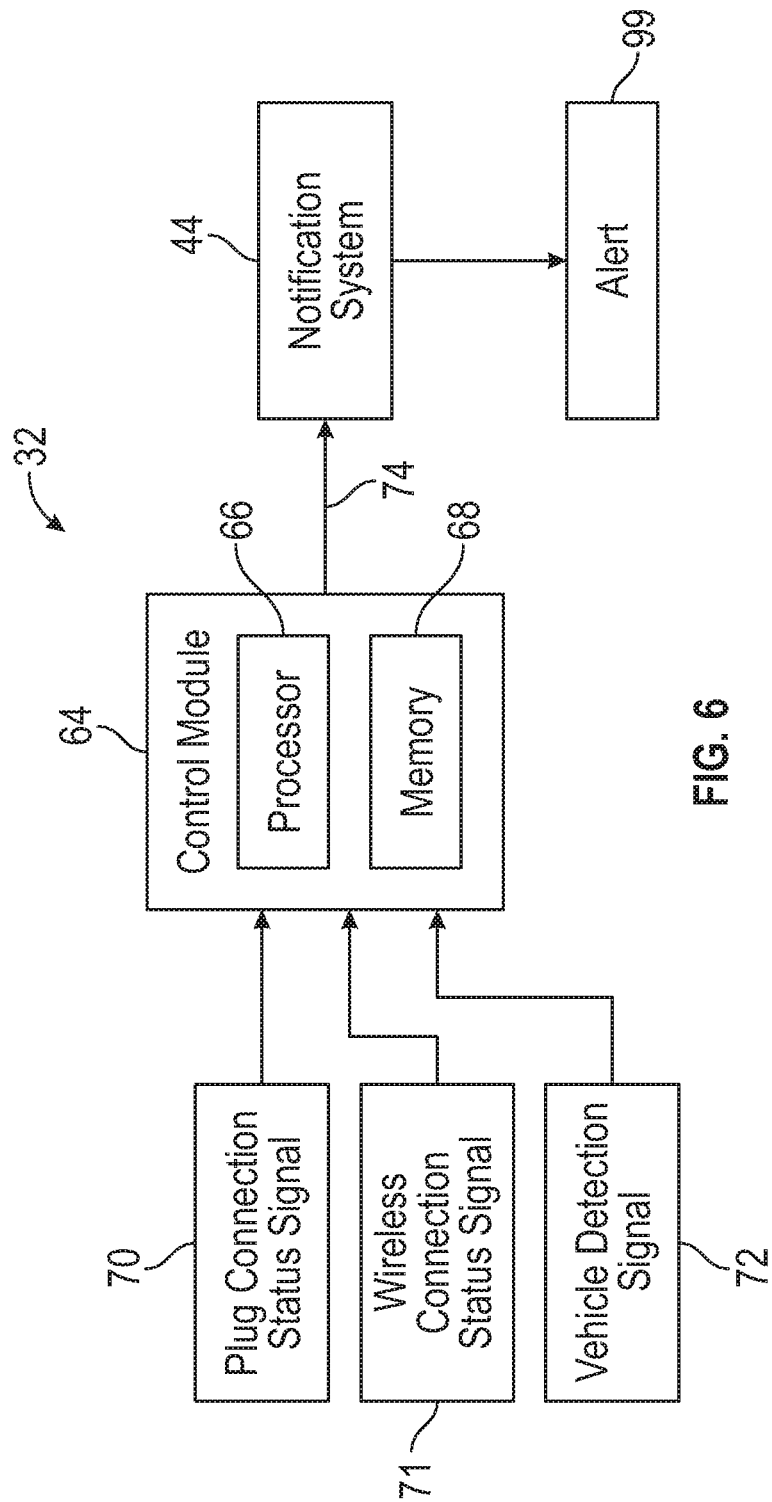
FIG. 6 is a block diagram further illustrating features of the exemplary vehicle charging station of FIG. 2.

This disclosure describes a vehicle charging station for charging an energy storage device (e.g., a battery pack) of an electrified vehicle. The vehicle charging station may include a sensor system for detecting whether a vehicle is parked near the charging station and a notification system for issuing an alert if the vehicle charging station remains unconnected to the vehicle after a threshold amount of time since detecting the vehicle. These and other features of this disclosure are discussed in greater detail in the following paragraphs of this detailed description.

FIG. 1 schematically illustrates a powertrain 10 of an electrified vehicle 12. The powertrain 10 shown in FIG. 1 is highly schematic and is not intended to limit this disclosure. Various additional components could alternatively or additionally be employed by the powertrain 10 within the scope of this disclosure. The electrified vehicle 12 may be a battery electric vehicle (BEV) or a plug-in hybrid electric vehicle (PHEV), for example. Therefore, although not shown in this embodiment, the electrified vehicle 12 could be equipped with an internal combustion engine that can be employed either alone or in combination with other energy sources to propel the electrified vehicle 12.

In the illustrated embodiment, the electrified vehicle 12 is a full electric vehicle propelled solely through electric power, such as by an electric machine 14, without assistance from an internal combustion engine. The electric machine 14 may operate as an electric motor, an electric generator, or both. The electric machine 14 receives electrical power and provides a rotational output power. The electric machine 14 may be connected to a gearbox 16 for adjusting the output torque and speed of the electric machine 14 by a predetermined gear ratio. The gearbox 16 is connected to a set of drive wheels 18 by an output shaft 20. A voltage bus 22 electrically connects the electric machine 14 to a battery pack 24 through an inverter 26. The electric machine 14, the gearbox 16, and the inverter 26 may be collectively referred to as a transmission 28.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the electric machine 14 and/or other electrical loads of the electrified vehicle 12. Other types of energy storage devices and/or output devices can also be used to electrically power the electrified vehicle 12.

The electrified vehicle 12 may also be equipped with a charging system 30 for charging the energy storage devices (e.g., battery cells) of the battery pack 24. The charging system 30 may be located onboard the electrified vehicle 12 and can be connected to a vehicle charging station (see, e.g., FIG. 2) or some other external power source for receiving and distributing power received from the station/external power source throughout the electrified vehicle 12.

An infrastructure of vehicle charging stations is desired for charging the battery packs of electrified vehicles. As discussed in greater detail below, charging stations may be equipped with sensor and notification systems for ensuring proper utilization of the charging station infrastructure.

FIG. 2 is a highly schematic depiction of a vehicle charging station 32 that may be employed to charge energy storage devices, such as battery packs of electrified vehicles. The vehicle charging station 32 may be any type of charging station (e.g., level 1, 2, DC, wireless, etc.). The vehicle charging station 32, including its various components, may be powered by an external power source 35 (shown schematically). In an embodiment, the external power source 35 includes utility grid power. In another embodiment, the external power source 35 includes an alternative energy source, such as solar power, wind power, etc. In yet another embodiment, the external power source 35 includes a combination of utility grid power and alternative energy sources A vehicle 34 is shown parked in proximity to the vehicle charging station 32. For example, the vehicle 34 may be parked in a parking space 36 that is designated for use with the vehicle charging station 32. The various components of the vehicle charging station 32 and the vehicle 34 are shown schematically to better illustrate the features of this disclosure and are not necessarily depicted in their exact locations or configurations. It should further be understood that the components depicted in FIG. 2 are not necessarily drawn to scale.

During certain situations, the vehicle 34 could be a non-electrified vehicle that does not require using the vehicle charging station 32 for charging. For example, the driver of the vehicle 34 may not understand or may simply choose to ignore that the parking space 36 is designated for electrified vehicles that can be recharged via the vehicle charging station 32. In other situations, the vehicle 34 could be an electrified vehicle whose driver/operator has forgotten or otherwise neglected to connect the vehicle charging station 32 to the vehicle 34. It may therefore be desirable for the vehicle charging station 32 to notify the driver of the vehicle 34 that they are either impermissibly parked or have not properly connected the vehicle charging station 32 to the vehicle 34.

The vehicle charging station 32 may include, among other things, a housing 38, a charging cord 40, a sensor system 42, and a notification system 44. In general, the housing 38 houses the various internal components of the vehicle charging station 32. In an embodiment, the housing 38 includes a pedestal 48 that extends upwardly from a ground surface 46. However, the size, shape, and configuration of the housing 38 is not intended to limit this disclosure. Although not shown, the housing 38 could include one or more output displays for displaying information to an occupant of the vehicle 34.

The charging cord 40 may extend outside of the housing 38 for connecting to an electrified vehicle. For example, the charging cord 40 may include a plug 50, or connector, configured to connect to a charging port 52 of an electrified vehicle. Current originating from the external power source 35 may be transferred from the vehicle charging station 32 to the charging port 52 of an electrified vehicle for charging the battery pack via the charging cord 40. The charging port 52 is shown schematically on the vehicle 34 of FIG. 2 solely for the sake of illustration; however, the vehicle 34 would not be equipped with this feature if it is a conventional, internal combustion engine powered vehicle that is improperly parked in the parking space 36 or a vehicle equipped with wireless charging components.

The sensor system 42 is adapted to sense whether a vehicle (e.g., the vehicle 34 or any other vehicle) is parked near the vehicle charging station 32, such as in the parking space 36 that is designated for the vehicle charging station 32. In an embodiment, the sensor system 42 includes one or more proximity sensors 54 for detecting whether a vehicle is parked in the parking space 36 or near the housing 38. The proximity sensors 54 may be capacitive, ultrasonic, magnetic, weight, lidar, infrared, induction, image processing, radar, or any other type of sensors or combination of sensors.

The notification system 44 is adapted to generate an alert 99 if certain conditions have been met. For example, if the sensor system 42 senses the vehicle 34 and the charging cord 40 of the vehicle charging station 32 remains unplugged relative to the vehicle 34 after a threshold amount of time since detecting the vehicle 34, the notification system 44 may be commanded to issue the alert. As schematically illustrated by FIG. 2, the alert 99 notifies the operator of the vehicle 34 that they are either impermissibly parked or have neglected to plug the charging cord 40 into the vehicle 34 for charging. In an embodiment, the sensor system 42 can detect current flow from the vehicle charging station 32. If the charging cord 40 is removed from the vehicle charging station 32 but is not properly seated to the vehicle for whatever reason, the notification system 44 may issue the alert 99 to notify the consumer that the vehicle is not charging.

The alert 99 may be generated in a variety of ways. In an embodiment, the alert 99 is a visual alert produced by a light source 56 of the notification system 44 (see FIG. 2). In another embodiment, the alert 99 is an audible alert produced by a speaker 58 of the notification system 44 (see FIG. 3). In another embodiment, the alert 99 is both a visual alert from the light source 56 and an audible alert from the speaker 58 of the notification system 44 (see FIG. 4). In yet another embodiment, a visual alert can be produced as soon as a vehicle is detected and then the audible alert can be introduced after a threshold amount of time if the vehicle is not connected to the vehicle charging station 32.

In yet another embodiment, the alert 99 is an alert signal (see FIG. 5) that is communicated by a communication device 60 of the notification system 44 to a remotely located entity 62 (e.g., parking enforcement agency, tow company, etc). The communication device 60 may communicate with the remotely located entity 62 using any communication protocol or combination of communication protocols, including but not limited to Wi-Fi, cellular, Bluetooth Low Energy (BLE), internet, etc. The alert signal may be communicated to the remotely located entity 62 either instead of the visual/audible alerts or in addition to these alerts. In yet another embodiment, if the sensor system 44 is equipped with a camera, a photo may be taken of the offending vehicle's license plate and then sent to the remotely located entity 62 via the communication device 60.

Referring now to the block diagram of FIG. 6, the vehicle charging station 32 may include a control module 64 for controlling the various functions of the vehicle charging station 32. In an embodiment, the control module 64 includes a processing unit 66 and non-transitory memory 68 for executing the various control strategies of the vehicle charging station 32.

The control module 64 may receive and process various inputs for controlling the vehicle charging station 32. A first input to the control module 64 may include a plug connection status signal 70 from the charging cord 40. The plug connection status signal 70 indicates that the charging cord 40 has been plugged into an electrified vehicle. Alternatively, the first input to the control module 64 may include a wireless connection status signal 71 if the electrified vehicle is equipped with a wireless charging system and therefore it is not necessary to plug the charging cord 40 into the vehicle.

In response to receiving the plug connection status signal 70 or the wireless connection status signal 71, the control module 64 may control the amount of charge supplied from the vehicle charging station 32 to the electrified vehicle during a charging event. For example, the control module 64 may control the amount of voltage and current that is supplied during the charging event as well as the length of the charge, among various other parameters.

A second input to the control module 64 may include a vehicle detection signal 72 from the sensor system 42. The vehicle detection signal 72 indicates that the sensor system 42 has detected a vehicle parked in proximity to the vehicle charging station 32. The control module 64 may monitor whether the plug connection status signal 70 is received within a threshold amount of time after receiving the vehicle detection signal 72. If the plug connection status signal 70 has not been received within the threshold amount of time, the control module 64 may communicate a command signal 74 to the notification system 44 for generating the alert 99.

Figure 7:
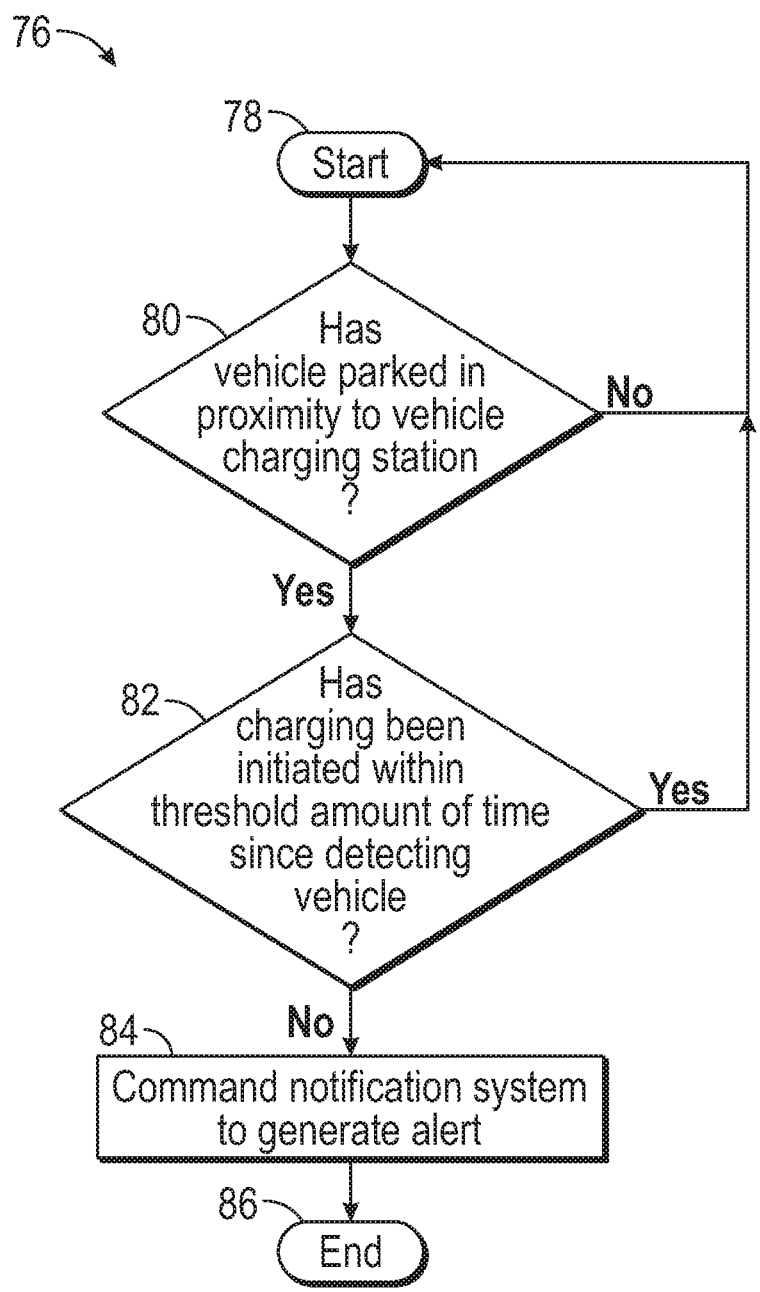
FIG. 7 schematically illustrates a method for controlling a vehicle charging station to provide notification of an incorrect usage of the charging station.

FIG. 7, with continued reference to FIGS. 1-6, schematically illustrates a method 76 for controlling the vehicle charging station 32 to provide notification of an incorrect usage of the vehicle charging station 32. In an embodiment, the control module 64 is programmed with one or more algorithms adapted to execute the exemplary method 76.

The exemplary method begins at block 78. At block 80, the control module 64 monitors whether a vehicle has parked in proximity to the vehicle charging station 32. For example, the control module 64 may periodically monitor whether the vehicle detection signal 72 has been received from the sensor system 44 to determine whether a vehicle is parked in the parking space 36 or is otherwise parked near the vehicle charging station 32.

If the vehicle detection signal 72 has been received indicating that a vehicle is parked in proximity to the vehicle charging station 32, the method 76 proceeds to block 82 by analyzing whether charging has been initiated within a threshold amount of time since receiving the vehicle detection signal 72. For example, the control module 64 may determine whether the charging cord 40 has been plugged into the vehicle via the plug connection status signal 70 or whether wireless charging has been initiated via the wireless connection status signal 71 within the threshold amount of time since receiving the vehicle detection signal 72. The threshold amount of time may be a predefined value of any duration of time (e.g., one minute, two minutes, five minutes, etc.).

The method 76 may generate an alert or notification at block 84 if charging via the vehicle charging station 32 has not been initiated after the threshold amount of time has expired. For example, the control module 64 may communicate the command signal 74 to the notification system 44 for generating the alert. The alert provides notification to the operator of the vehicle that they are either impermissibly parked or have neglected to plug the charging cord 40 into the vehicle for charging or wirelessly connect the vehicle for charging. The alert could alternatively or additionally include a remote signal sent to a remotely located entity, such as a parking enforcement agency or a towing company. The method 76 may then end at block 86.

The vehicle charging stations of this disclosure are configured to ensure that the charging stations are not blocked from use by non-charging customers and that charging customers do not forget or neglect to charge their vehicles. The proposed charging stations utilize sensor and notification systems that notify offenders of misuse in a simple and cost effective manner. The result is improved utilization of the charging infrastructure.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle charging station, comprising:
a housing;
a sensor system configured to detect when a vehicle is parked near the housing;
a notification system configured to communicate an alert when the vehicle is parked near the housing and charging has not been initiated within a threshold amount of time; and
a control module configured to command the notification system to generate the alert when charging via the vehicle charging station has not been initiated after the threshold amount of time has passed since detecting the vehicle.

2. The vehicle charging station as recited in claim 1, comprising a charging cord extending from the housing.

3. The vehicle charging station as recited in claim 2, wherein the charging cord includes a plug for connecting to a vehicle charging port.

4. The vehicle charging station as recited in claim 1, wherein the sensor system includes a proximity sensor for sensing whether the vehicle is parked in a parking spot associated with the vehicle charging station.

5. The vehicle charging station as recited in claim 1, wherein the alert is a visual alert produced by a light source of the notification system.

6. The vehicle charging station as recited in claim 1, wherein the alert is an audible alert produced by a speaker of the notification system.

7. The vehicle charging station as recited in claim 1, wherein the alert includes both an audible alert produced by a speaker of the notification system and a visual alert produced by a light source of the notification system.

8. The vehicle charging station as recited in claim 1, wherein the notification system includes a communication system configured to communicate the alert to a remotely located agency.

9. The vehicle charging station as recited in claim 1, wherein the control module is configured to monitor a plug connection status signal of a charging cord and a vehicle detection signal from the sensor system.

10. The vehicle charging station as recited in claim 1, wherein the control module is configured to monitor a wireless connection status signal to determine when the vehicle charging station has been wirelessly connected to the vehicle.

11. The vehicle charging station as recited in claim 1, wherein the alert indicates improper usage of the vehicle charging station to an operator of the vehicle.

12. The vehicle charging station as recited in claim 1, wherein said sensor system and said notification system are powered by an external power source.

13. A method, comprising:
detecting whether a vehicle is parked near a vehicle charging station; and
generating an alert from a notification system of the vehicle charging station, in response to a command from a control module, when charging via the vehicle charging station has not been initiated within a threshold amount of time since detecting the vehicle.

14. The method as recited in claim 13, wherein detecting whether the vehicle is parked near the charging station includes:
sensing, with a sensor system of the vehicle charging station, when the vehicle is parked in a parking space associated with the vehicle charging station.

15. The method as recited in claim 14, wherein the sensor system includes at least one proximity sensor.

16. The method as recited in claim 13, wherein generating the alert includes:
producing a visual alert with a light source of the notification system.

17. The method as recited in claim 13, wherein generating the alert includes:
producing an audible alert with a speaker of the notification system.

18. The method as recited in claim 13, wherein generating the alert includes:
producing a visual alert with a light source of the notification system; and
producing an audible alert with a speaker of the notification system.

19. The method as recited in claim 13, wherein generating the alert includes:
communicating the alert to a remotely located agency with a communication device of the notification system.

* * * * *